H. I. FINCH.
ELECTRIC MOTOR.
APPLICATION FILED APR. 15, 1911.
1,039,110.
Patented Sept. 24, 1912.
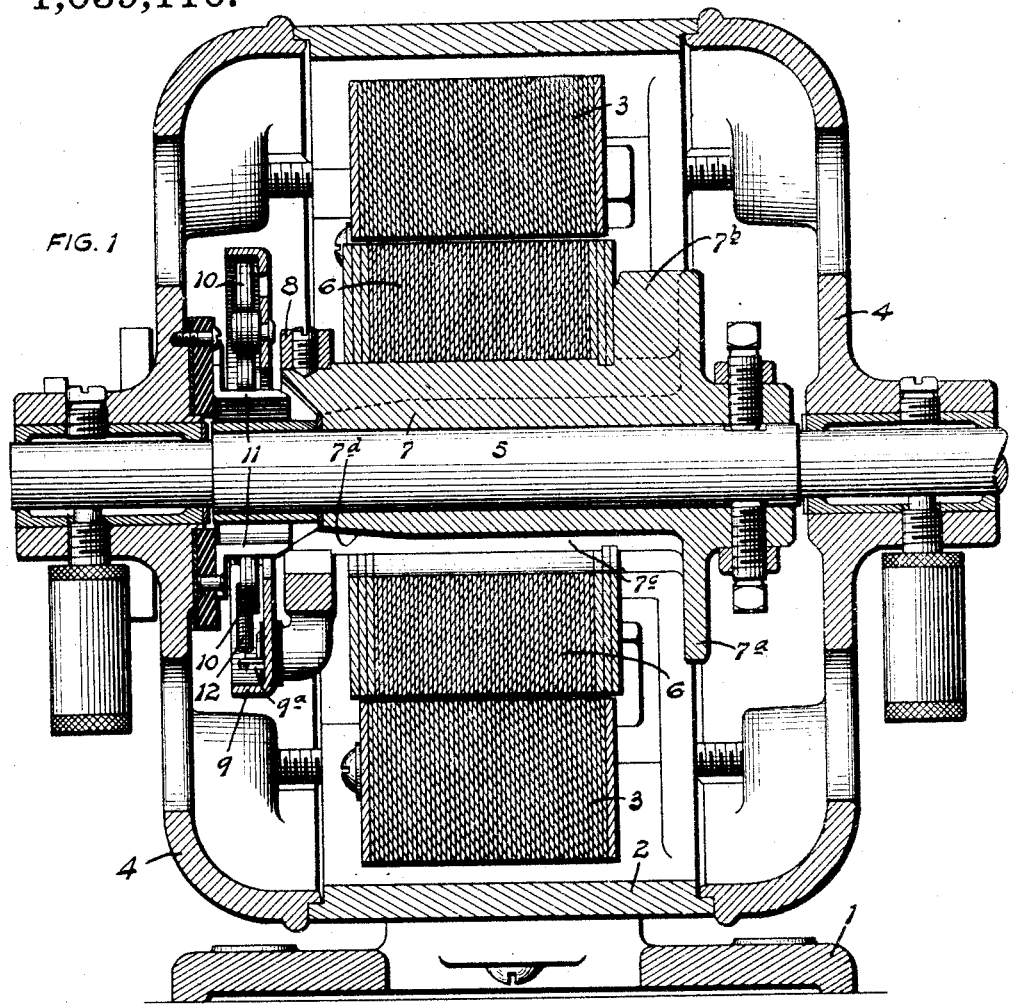
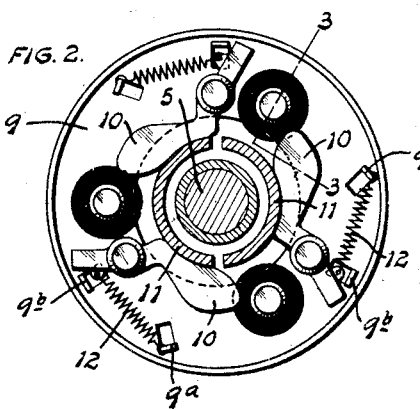
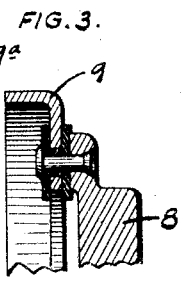
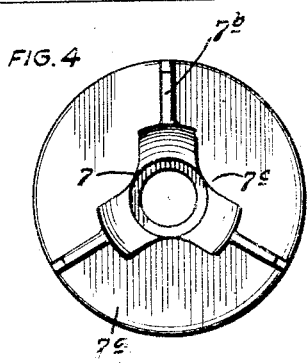
WITNESSES
Wm. Janus.
E. W. Warrington
INVENTOR
HERBERT I. FINCH
BY J. R. Cornwall, ATT'Y.

UNITED STATES PATENT OFFICE.

HERBERT I. FINCH, OF ST. LOUIS, MISSOURI, ASSIGNOR TO EMERSON ELECTRIC MANUFACTURING COMPANY, OF ST. LOUIS, MISSOURI, A CORPORATION OF MISSOURI.

ELECTRIC MOTOR.

1,039,110.  Specification of Letters Patent.  Patented Sept. 24, 1912.

Application filed April 15, 1911. Serial No. 621,351.

*To all whom it may concern:*

Be it known that I, HERBERT I. FINCH, a citizen of the United States, residing at St. Louis, Missouri, have invented a certain new and useful Improvement in Electric Motors, of which the following is a full, clear, and exact description, such as will enable others skilled in the art to which it appertains to make and use the same, reference being had to the accompanying drawings, forming part of this specification, in which—

Figure 1 is a sectional view through my improved motor. Fig. 2 is a detailed view of the centrifugally operated cut-outs for the starting coils. Fig. 3 is a sectional view on line 3—3, Fig. 2. Fig. 4 is a detailed view of the armature hub.

My invention relates to a new and useful improvement in electric motors the object being to simplify the construction so as to reduce the cost of manufacture, and at the same time to produce an efficient and easy running self-ventilating motor.

With these objects in view, the invention consists in the construction, arrangement and combination of the several parts, all of which will be herein described and afterward pointed out in the claim.

In the drawings, 1 indicates the base casing to which is secured the cylindrical casting 2 forming a housing for the field laminations 3.

4 are end castings which provide bearings for the armature shaft 5.

6 are laminations of the armature and 7 is a hub upon which said laminations are arranged; said hub having an outwardly extending flange 7ª at or near one end from which extends inwardly partition walls 7ᵇ constituting a fan blade. The cylindrical portion of the hub is reduced by the provision of longitudinally disposed grooves 7ᶜ in the periphery thereof, which grooves form air passages communicating with the spaces between the blades 7ᵇ. The bottom walls of these grooves are departed as shown at 7ᵈ, Fig. 1, while the surfaces of the hub at this end are reduced to form a shoulder for a spider frame 8, secured in position thereon by means of a suitable clamping screw, as shown. This spider frame supports a flanged disk 9 which is insulated therefrom as shown in Fig. 3. To this flanged disk are pivotally mounted a series of contact making elements 10 which coöperate with the split ring 11, said split ring serving as the commutator for the starting coils of the motor. The contact weights 10 are held normally against the split ring 11 by means of springs 12, one end of which is secured to tongues 9ª struck up from the flanged disk while the other end is secured to the outer end of the centrifugally operated contact making device. Tongues 9ᵇ are also struck up from the flanged disk, so as to form stops for the levers 10 and prevent the springs 12 from forcing said levers inwardly too far, when the end casting to which the split ring 11 is secured is removed. The ends of this split ring are preferably beveled, as shown in Fig. 1, and when the head casting to which it is secured is being assembled in position, this beveled edge forces the weights 10 outwardly, so that they will ride upon the periphery of the split ring, as shown, said rings being prevented from moving inwardly too far by the stop tongues 9ᵇ.

The windings of the motor are not shown, as they form no part of the present invention, but said windings may be the same as disclosed in the Meston and Finch Patent 844,384, dated February 19, 1907.

When the current is turned on, the starting coils remain in circuit as long as the springs hold the contact levers 10 against the split ring. When, however, the motor attains speed, centrifugal force operates upon the weighted ends of the contact levers to throw them outwardly and cut the current from the starting coils. These weighted pieces 10 are preferably made of several laminations which are punched from thin sheet metal for the sake of cheapening the cost of their production. When the motor is operated, air enters the passages 7ᶜ and passes out between the end of the armature and the flange 7ª. The blades 7ᵇ operate as fan blades upon the principle of the well known centrifugal blower fan, wherein air entering at the "eye" of the fan will be forced outwardly by the rapidly revolving blade. The air passing through these grooves at different points around the hub will tend to keep the armature cool, the flow of current of air through these grooves being proportioned to the speed of rotation of the armature.

What I claim is:

In combination with a shaft and armature laminæ, an integrally cast armature hub formed with an annular flange and having a sleeve portion adapted to encircle the shaft, which sleeve portion is provided with longitudinal grooves extending from the flange to the opposite end of the hub and having fan blades interposed between said grooves, which blades extend continuously between said laminæ and said flange, the said grooves being deepest at the end opposite the flange and the hub being provided at said end with a spider frame encircling said hub and passing over said grooves, and at its other end with a portion extending beyond said flange, and means carried by said extending portion for securing the hub to the shaft.

In testimony whereof I hereunto affix my signature in the presence of two witnesses, this 12th day of April, 1911.

HERBERT I. FINCH.

Witnesses:
M. P. SMITH,
B. L. CROWLEY.

Copies of this patent may be obtained for five cents each, by addressing the "Commissioner of Patents, Washington, D. C."